United States Patent
Figueras

(10) Patent No.: US 6,546,569 B2
(45) Date of Patent: Apr. 15, 2003

(54) PORTABLE TOILET SYSTEM

(76) Inventor: Kenneth Dwayne Figueras, 52083 SE. 9th St., Scappoose, OR (US) 97056

( * ) Notice: Subject to any disclaimer, the term of this patent is extended or adjusted under 35 U.S.C. 154(b) by 0 days.

(21) Appl. No.: 09/901,777

(22) Filed: Jul. 9, 2001

(65) Prior Publication Data

US 2003/0005513 A1 Jan. 9, 2003

(51) Int. Cl.[7] ............................................. A47K 11/04
(52) U.S. Cl. ............................ 4/483; 460/479; 460/484
(58) Field of Search ........................... 4/479, 483, 484, 4/460, 449; 297/188.09, 188.1, 29, 17, 43, 44, 183.5, 440.1; 108/152; 182/187, 188

(56) References Cited

U.S. PATENT DOCUMENTS

| | | |
|---|---|---|
| 1,306,041 A | 6/1919 | Wittmann |
| 1,663,966 A | 3/1928 | Ament et al. |
| 2,053,586 A | 9/1936 | Tohrner |
| 2,376,036 A | 5/1945 | Cotton |
| 3,063,061 A * | 11/1962 | Bertram ...................... 4/484 |
| 3,340,828 A * | 9/1967 | Smith et al. ................ 182/187 |
| 3,513,940 A | 5/1970 | Ussery |
| 4,120,379 A | 10/1978 | Carter |
| 4,909,353 A | 3/1990 | Govin et al. |
| 4,936,416 A | 6/1990 | Garon |
| 5,083,324 A | 1/1992 | Strong |
| 6,023,792 A | 2/2000 | Croucher et al. |
| 6,142,567 A * | 11/2000 | Bentley ..................... 297/273 |

* cited by examiner

Primary Examiner—Robert M. Fetsuga
Assistant Examiner—Tuan Nguyen
(74) Attorney, Agent, or Firm—Kolisch Hartwell, P.C.

(57) ABSTRACT

A portable outdoor toilet system configured to be suspended from an object to support the toilet system above the ground is provided. The toilet system comprises a toilet seat having a front portion and a back portion, and a suspension system configured to be coupled to the object to suspend the toilet seat above the ground. The suspension system includes at least one tensile support member coupled to the toilet seat between the front portion and the back portion of the toilet seat. The tensile support member extends upwardly from the toilet seat toward the object to support the toilet seat from a location above the toilet seat. The suspension system also includes a securing device coupled to the tensile support member to secure the toilet system to the object.

14 Claims, 3 Drawing Sheets

PORTABLE TOILET SYSTEM

TECHNICAL FIELD

The present invention relates generally to portable toilet systems, and more particularly to a portable outdoor toilet system that may be suspended from an object to support the system above the ground.

BACKGROUND

With the growing popularity of outdoor recreation, the disposal of solid human waste generated by visitors in outdoor recreational areas has increasingly become a problem. In the past, many recreationalists simply buried solid human waste, along with any used toilet paper, in a shallow hole. However, this practice is now out of favor in many areas, as it may pose any of several potential problems. For example, burying human waste near a campsite or water source may pose health risks, such as the potential spread of disease, to other users of the area. Also, the waste is often buried incompletely, leading to unsightly toilet areas around popular campsites. Finally, human waste decomposes very slowly in some environments, such as arid environments, potentially posing long-term pollution and health risks. In response to these problems, many agencies in charge of outdoor areas have adopted regulations requiring hikers, hunters, fishermen, rafters and other users of the areas to pack out all solid human waste generated in the regulated area.

The need to remove human waste from outdoor areas, as well as the desire for comfort while away from modem toilet facilities, has lead to the development of several different types of portable toilet systems over the years. One type of system consists generally of a freestanding, collapsible frame that supports a toilet seat and waste-collection bag over the ground. This type of system has the advantage that the frames may be folded for storage and transportation. However, these toilets may not be suitable for use on uneven or sloped ground, as the frame may not be fully in contact with the ground, or the seat may not be level when used on a non-level surface.

Another known portable system consists of a toilet seat mounted onto a hollow base configured for holding solid waste. Typically, these bases are box-shaped, and are tall enough so a user can sit on the seat without having to crouch uncomfortably low. The bases generally have a removable lid that can be attached to the box to seal waste in the box, or removed to allow the attachment of the seat for use. While these toilet systems are simple and durable, they are less than ideal for use in activities such as hunting and fishing. First, these toilet systems generally are fairly large and bulky, and may be difficult to carry into some locations. Second, as with the collapsible frame-type toilet systems, the bases are designed to sit on the ground, and may be difficult to use on uneven or sloped terrain.

Yet another type of known portable toilet system consists generally of a toilet seat supported above the ground at the front by a leg and at the back by an object such as a tree or car trailer hitch. Because these systems employ the use of one or more legs to partially support the seat above the ground, they may present the same difficulties with use on uneven or sloped ground as freestanding toilet systems. Thus there remains a need for a compact, lightweight portable toilet system for outdoor use that is suitable for use on all types of terrain.

SUMMARY OF THE INVENTION

The present invention provides a portable outdoor toilet system configured to be suspended from an object without the use of a leg to support the toilet system against the ground. The toilet system comprises a toilet seat having a front portion and a back portion, and a suspension system configured to be coupled to the object to suspend the toilet seat above the ground. The suspension system includes at least one tensile support member coupled to the toilet seat between the front portion and the back portion of the toilet seat, the tensile support member extending upwardly from the toilet seat toward the object to support the toilet seat from a location above the toilet seat. The suspension system also includes a securing device coupled to the tensile support member to secure the toilet system to the object.

DETAILED DESCRIPTION OF THE PREFERRED EMBODIMENTS

Figure 1:
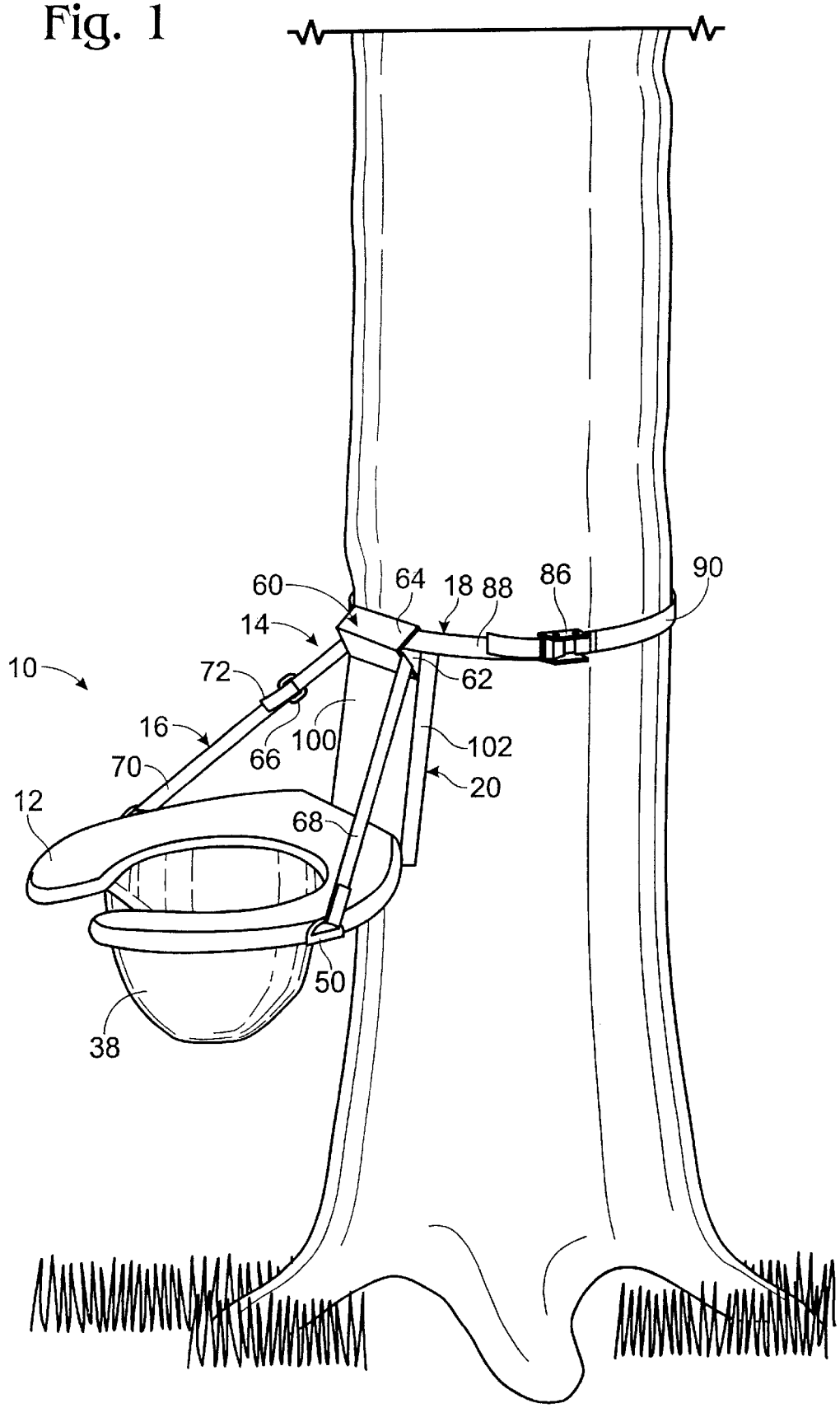
FIG. 1 is a perspective view of a first embodiment of a toilet system according to the present invention suspended from a trunk of a tree.

The present invention provides a compact, lightweight and highly portable toilet system for outdoor use. The toilet system is configured to be suspended from an object such as a tree to support the toilet seat above the ground, allowing the toilet system to be easily used on uneven terrain. One embodiment of a toilet system according to the present invention is depicted generally at 10 in FIG. 1. Toilet system 10 includes a toilet seat 12, and a suspension system 14 for suspending the toilet seat from the trunk of a tree. Suspension system 14 includes a tensile support member 16 coupled to seat 12 for supporting the seat from a location above the seat, a securing device 18 for securing toilet system 10 to the object, and a frame 20 for coupling the various parts of toilet system 10 to one another. While toilet system 10 is shown mounted to the trunk of a tree in FIG. 1, it will be appreciated that toilet system 10 can be configured to be mounted to any desired object. Furthermore, while the depicted embodiment is configured to be mounted to a generally upright object, such as the trunk of a tree, toilet system 10 can also be configured to be mounted to objects of other orientations.

Any suitable structure may be used for toilet seat 12. In the depicted embodiment, toilet seat 12 is a standard commercially available U-shaped seat. Alternately, an O-shaped seat, or any other desired shape of seat, may be used without departing from the scope of the present invention. Similarly, toilet seat 12 may be made from any suitable material. Generally, it is desirable to construct toilet seat 12 from a strong, stiff material so that the seat can support users of a wide variety of weights without bending. Also, it may be desirable to construct toilet seat 12 from a lightweight and inexpensive material to decrease the overall weight and cost of toilet system 10. Examples of suitable materials include many plastics, and lightweight metals such as aluminum or aluminum alloys.

Figure 2:
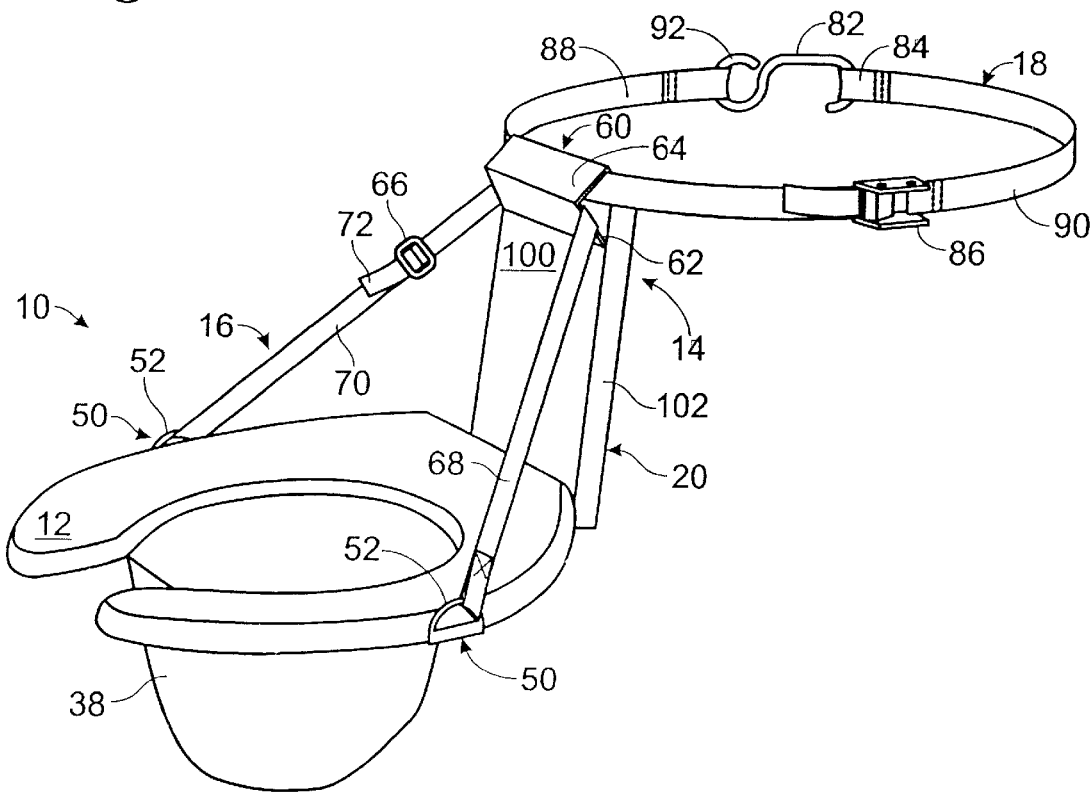
FIG. 2 is an isometric view of the embodiment of FIG. 1, with a toilet seat in a deployed position and a waste receptacle attached to the toilet seat.
Figure 3:
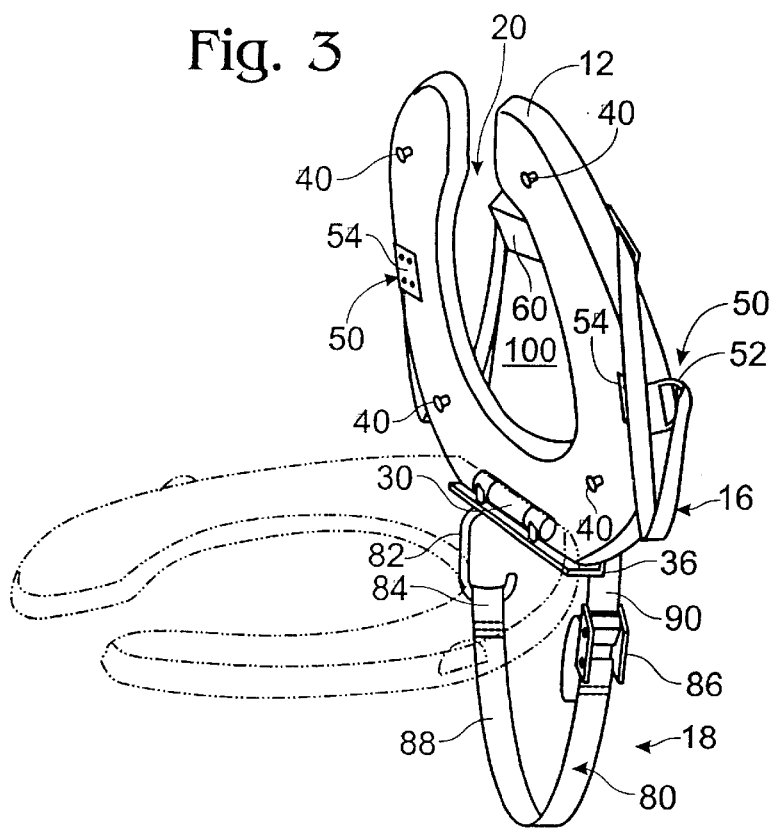
FIG. 3 is an isometric view of the embodiment of FIG. 1, with the toilet seat in a storage position and without the waste receptacle attached to the toilet seat.
Figure 4:
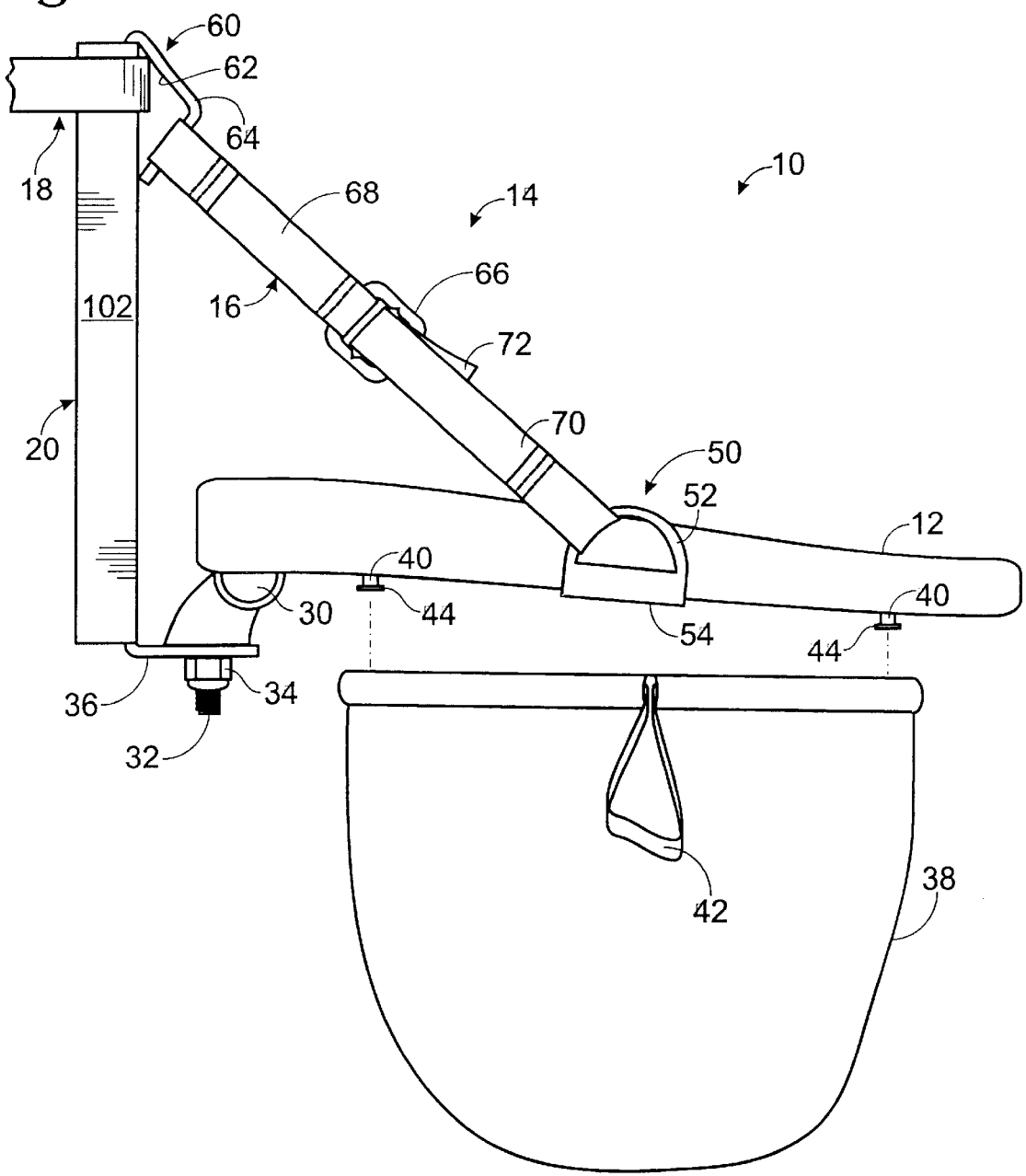
FIG. 4 is a partially exploded side elevational view of the embodiment of FIG. 1.

Referring now to FIGS. 2–4, toilet seat 12 includes a hinged connector 30 coupled to the back portion of the toilet seat. Hinged connector 30 is fastened to the lower portion of frame 20, and allows toilet seat 12 to be pivoted between a deployed position, illustrated in FIG. 2, and a folded storage position, illustrated in FIG. 3. When in the folded position, seat 12 is situated generally parallel to and rests against frame 20, giving toilet system 10 a flat profile. This allows toilet system 10 to fit in a backpack, a satchel-like carrying bag, or other carrying container for easy transportation.

Toilet seat 12 may be coupled to frame 20 in any suitable manner. In the depicted embodiment, hinged connector 30 is coupled to the bottom portion of frame 20 with at least one bolt 32 and corresponding nut 34. Preferably, toilet seat 12 is coupled to frame 20 with two or more fasteners to improve the lateral stability of the toilet seat on the frame. Many commercially available toilet seats come with two bolts that extend downwardly from the hinged connector for fastening the toilet seat to the body of a toilet. To take advantage of this feature, the bottom portion of frame 20 may have a horizontal extension 36 configured to accept these bolts so that toilet seat 12 may be mounted without the need for any additional hardware.

In many situations, a user of system 10 may desire, or may be required, to remove all solid waste from an outdoor recreation area. To provide for the easy collection of waste, a waste receptacle 38 may be coupled to toilet system 10 underneath toilet seat 12. Any suitable mechanism for positioning and coupling waste receptacle 38 beneath toilet seat 12 may be used. In the depicted embodiment, toilet seat 12 includes a plurality of tabs 40 disposed on the underside of the toilet seat configured for the attachment of waste receptacle 38 with a drawstring 42. Each tab 40 has a lip 44 around which drawstring 42 may be tightened. As many or as few tabs 40 as desired may be provided on the underside of toilet seat 12. In the depicted embodiment, four tabs 40 are provided in a four-corners arrangement. This ensures that waste receptacle 38 is held fully open beneath toilet seat 12, yet is easy to attach and remove from the toilet seat.

At least one connector 50 is disposed on toilet seat 12 between the front region and the back region of the toilet seat for connecting tensile support member 16 to the toilet seat. In the depicted embodiment, two connectors 50 are coupled to opposite sides of toilet seat 12. Connector 50 may be designed to allow the attachment of any desired tensile support member 16. For example, if tensile support member 16 is a cord with a circular cross section, connector 50 may comprise an eye ring coupled to the toilet seat through which the cord may be looped. In the depicted embodiment, tensile support member 16 is formed from one or more lengths of strap. Thus, each connector 50 includes a D-ring portion 52 that extends upward along the sides of toilet seat 12 and is sized to fit the width of the strap. Furthermore, the D-ring portions have a low profile so that they do not cause discomfort to a user during the use of toilet system 10. Each connector 50 also includes a mounting portion 54 for mounting the connector to the underside of toilet seat 12. Mounting portion 54 is configured to allow connector 50 to be mounted to toilet seat 12 with a suitable fastener. In the depicted embodiment, each mounting portion 54 includes a plurality of holes to allow connector 50 to be bolted to the underside of toilet seat 12.

Tensile support member 16 is configured to be coupled to connectors 50 to support toilet seat 12 from a location above the toilet seat. In the depicted embodiment, tensile support member 16 extends diagonally upward to couple to the frame at a location higher than toilet seat 12. Tensile support member 16 can be configured to support the toilet seat in any suitable manner. For example, tensile support member 16 can be configured to attach directly to the trunk of the tree at a location above the toilet seat, without the use of frame 20. In the depicted embodiment, however, tensile support member 16 attaches to an anchor 60 disposed on the upper portion of frame 20. Anchor 60 includes a channel 62 through which tensile support member 16 extends to couple the tensile support member to the frame. In the depicted embodiment, channel 62 is formed by bending an upper extension 64 of frame 20 downwardly into an angled, closed shape. However, upper extension 64 may be bent into any other desired shape, or may be formed by welding a suitably shaped piece to the upper portion of frame 20.

Tensile support member 16 may be made from any desired material. Typically, tensile support member 16 is made from a lightweight, flexible material to decrease the total weight of toilet system 10 and to increase the ease with which toilet system 10 may be folded for storage. Examples of suitable materials include cords, ropes, straps, or other flexible members made of any of a variety of materials. In the depicted embodiment, tensile support member 16 is made from a length of strap. A preferred strap material is nylon webbing, as it is strong, lightweight and does not stretch appreciably when loaded.

Tensile support member 16 may include an adjustment mechanism 66 to allow the length of the tensile support member to be adjusted. This allows the angle of toilet seat 12 relative to frame 20 to be adjusted so that the toilet seat can be positioned at an appropriate angle relative to the ground when the orientation of the tree trunk or other object is off vertical. In the depicted embodiment, adjustment mechanism 66 comprises a buckle. Examples of suitable buckles include ladder-lock buckles and spring-loaded cam buckles. In this configuration, tensile support member 16 is formed from two lengths of strap 68, 70. First length of strap 68 is fixed at one end to one connector 50 and at the other end to buckle 66. Second length of strap 70 is fixed to the other connector 50, and is adjustably coupled to buckle 66. The length of tensile support member 16 can thus be adjusted by pulling on loose end 72 of second length of strap 70 to pull the second length of strap through the buckle.

Besides tensile support member 16, suspension system 14 also includes securing device 18 for securing toilet system 10 to a desired object. Securing device 18 may have any suitable design to secure toilet system 10 to the desired object. In the depicted embodiment, securing device 18 is adapted to secure toilet system 10 to the trunk of a tree, and includes a flexible, elongate securing member 80 adapted to fit around the trunk of the tree. Securing member 80 may be coupled to frame 20 in any suitable manner. In the depicted embodiment, securing member 80 is coupled to frame 20 by extending through anchor 60 on the top portion of frame 20.

Securing member 80 may be secured around the tree trunk in any suitable manner. In the depicted embodiment, securing member 80 has opposing ends that are each equipped with a complementary connector so that the ends can be connected around the tree. Any suitable complementary connector may be used. In the depicted embodiment, one opposing end has a hook 82, and the other opposing end has a loop 84 configured to be attached to the hook. Securing member 80 is attached to the tree by first extending the opposing ends of the securing member around the tree trunk in opposite directions and then coupling loop 84 to hook 82. An adjustment mechanism 86 is disposed on securing member 80 to allow the length of the securing member to be adjusted to fit tree trunks of different circumferences, and to tighten securing device 18 around the trunk once it has been attached. Any suitable adjustment mechanism 86 may be used. In the depicted embodiment, securing member 80 comprises an adjustable buckle 86.

Securing member 80 may be made of any suitable material. Suitable materials include those that are flexible to allow securing member 80 to conform to the circumference of the tree trunk, and also those that are lightweight and inexpensive. A particularly preferred material is nylon webbing because of its light weight, durability, low cost and resistance to stretching. Similarly, securing member 80 may have any suitable construction. In the depicted embodiment, securing member 80 is formed from two separate lengths of strap 88, 90. First length of strap 88 is fixed at one end to a strap connection loop 92 formed in one end of hook 82, and is adjustably coupled at the other end to buckle 86. Second length of strap 90 is fixed at one end to buckle 86, and has loop 84 at the other end. First and second lengths of strap 88 and 90 are generally long enough to fit around large tree trunks, but can be shortened sufficiently with buckle 86 to fit around small diameter tree trunks as well.

Figure 5:
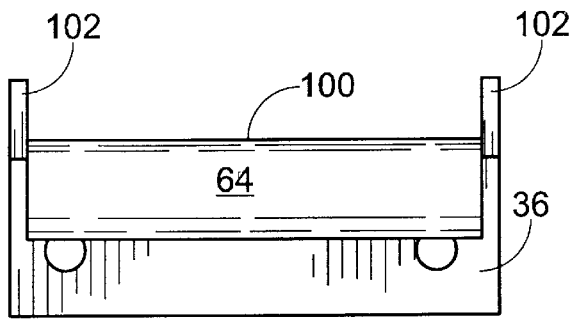
FIG. 5 is a top view of the frame of the embodiment of FIG. 1.

Suspension system 14 also includes frame 20 for coupling the various parts of toilet system 10 to one another and for supporting toilet seat 12 against the tree trunk. FIG. 5 shows a top view of a suitable embodiment of frame 20. Generally, frame 20 is formed from an elongate, rigid member that is configured to extend along the trunk of the tree. In the depicted embodiment, frame 20 is formed from a section of a U-shaped member, and includes a central portion 100 with upturned ends 102 that are oriented toward the tree. The use of a U-shaped member strengthens frame 20 without greatly increasing the weight of the frame, and also stiffens the frame. Anchor 60 is disposed on the top portion of frame 20, and horizontal extension 36 to which toilet seat 12 mounts is disposed on the bottom portion of frame 20, although the anchor and toilet seat mount may be disposed at any desired location on frame 20. Frame 20 may be made to any suitable dimensions and from any suitable material. Examples of suitable materials include lightweight metals such as aluminum and aluminum alloys.

Because connectors 50 are not located directly beneath anchor 60, putting weight on toilet seat 12 causes the back portion of the toilet seat to be pushed toward the tree trunk. The bottom portion of frame 12 helps to distribute the pressure exerted toward the tree trunk by toilet seat 12 and to stabilize the toilet seat against the tree. Alternatively, the back portion of toilet seat 12 may rest directly against the tree, or may have another suitable tree-contacting structure for stabilizing the toilet seat against the tree.

While the present invention has been particularly shown and described with reference to the foregoing embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

I claim:

1. A portable outdoor toilet system adapted to be suspended from a trunk of a tree without the use of a leg to support the toilet system against the ground, the toilet system comprising:
   a frame configured to at least partially support the toilet system against the trunk of the tree;
   a toilet seat coupled to the frame, the toilet seat having a front portion and a back portion; and
   a suspension system coupled to the frame for suspending the toilet seat from the tree, the suspension system including a strap coupled to the toilet seat between the front portion and the back portion of the toilet seat, a securing device coupled to the frame for securing the toilet system to the tree, the securing device being configured to be coupled to the tree at a location higher on the trunk of the tree than the toilet seat, and a buckle positioned along the strap to allow adjustment of the strap length.

2. The portable toilet system of claim 1, the frame having an upper portion and a lower portion, wherein the strap is coupled to the upper portion of the frame, and wherein the back portion of the toilet seat is coupled to the lower portion of the frame.

3. The portable toilet system of claim 2, wherein the toilet seat is pivotally coupled to the lower portion of the frame so that the seat may be pivoted between an open position and a closed position relative to the frame.

4. The portable toilet system of claim 1, wherein the frame is the tree-contacting portion.

5. The portable toilet system of claim 1, wherein the strap of the suspension system is a first strap, and wherein the securing device includes a second strap.

6. The portable toilet system of claim 5, wherein the second strap has a buckle to allow the securing device to be adjusted to accommodate tree trunks of various sizes.

7. The portable toilet system of claim 5, wherein the second strap includes a first end with a first fastener and a second end with a second fastener such that the second strap is secured around the tree by extending the first end and second end in opposite directions around the tree and connecting the first fastener to the second fastener.

8. The portable toilet system of claim 7, wherein the first fastener is a hook, and the second fastener is a loop configured to accept insertion of the hook.

9. The portable toilet system of claim 1, wherein the frame includes an anchor for coupling the strap to the frame, and wherein the anchor includes a channel through which the strap is threaded to couple the strap to the frame.

10. The portable toilet of claim 9, the frame having an upper portion and a lower portion, wherein the anchor is disposed on the upper portion of the frame, and wherein a seat mount to which the toilet seat is mounted is disposed on the lower portion of the frame.

11. The portable toilet of claim 1, wherein the toilet seat is pivotally mounted to the frame such that the toilet seat may be pivoted between a folded position and an unfolded position relative to the frame.

12. The portable toilet system of claim 1, further comprising a waste receptacle coupled to the toilet seat.

13. The portable toilet system of claim 12, the toilet seat having a bottom side, wherein the waste receptacle is coupled to the bottom side of the toilet seat.

14. The portable toilet system of claim 13, further comprising at least one tab coupled to the bottom side of the toilet seat for attaching the waste receptacle.

\* \* \* \* \*

UNITED STATES PATENT AND TRADEMARK OFFICE
CERTIFICATE OF CORRECTION

PATENT NO. : 6,546,569 B2
DATED : April 15, 2003
INVENTOR(S) : Kenneth Dwayne Figueras It is certified that error appears in the above-identified patent and that said Letters Patent is hereby corrected as shown below:

<u>Title page, Item [54] and Column 1, line 1,</u>
Please replace the existing title with -- PORTABLE TOILET SYSTEM HAVING AN OFF-GROUND SUSPENSION SYSTEM --.

Signed and Sealed this

Twenty-sixth Day of August, 2003

JAMES E. ROGAN
*Director of the United States Patent and Trademark Office*